(12) United States Patent
Ham et al.

(10) Patent No.: US 9,990,099 B2
(45) Date of Patent: Jun. 5, 2018

(54) DISPLAY DEVICE

(71) Applicant: LG DISPLAY CO., LTD., Seoul (KR)

(72) Inventors: Yong-Su Ham, Seoul (KR); Taeheon Kim, Seoul (KR); YongWoo Lee, Goyang-si (KR); YuSeon Kho, Seoul (KR); MyungJin Lim, Goyang-si (KR); Seulgi Choi, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 15/392,465

(22) Filed: Dec. 28, 2016

(65) Prior Publication Data

US 2017/0192560 A1 Jul. 6, 2017

(51) Int. Cl.
*G06F 3/044* (2006.01)
*G06F 3/041* (2006.01)
*G06F 3/01* (2006.01)
*H04M 1/02* (2006.01)

(52) U.S. Cl.
CPC .............. *G06F 3/044* (2013.01); *G06F 3/016* (2013.01); *G06F 3/041* (2013.01); *G06F 3/0412* (2013.01); *H04M 1/0266* (2013.01)

(58) Field of Classification Search
CPC ............................... G06F 3/016; G06F 3/0412
See application file for complete search history.

(56) References Cited

U.S. PATENT DOCUMENTS

| | | | |
|---|---|---|---|
| 9,182,820 B1* | 11/2015 | Hebenstreit | G09B 21/003 |
| 9,836,125 B2* | 12/2017 | Lim | G06F 3/016 |
| 2010/0123681 A1 | 5/2010 | Wu et al. | |
| 2010/0156845 A1* | 6/2010 | Kim | G06F 3/016 345/174 |
| 2012/0086651 A1* | 4/2012 | Kwon | G06F 3/016 345/173 |
| 2012/0229400 A1 | 9/2012 | Birnbaum et al. | |
| 2013/0033450 A1 | 2/2013 | Coulson et al. | |
| 2013/0154973 A1* | 6/2013 | Tung | G06F 3/041 345/173 |
| 2015/0116231 A1* | 4/2015 | Kim, II | G06F 3/016 345/173 |
| 2015/0169118 A1* | 6/2015 | Lee | G06F 3/047 345/174 |
| 2016/0179260 A1* | 6/2016 | Ham | G06F 3/0412 345/173 |
| 2016/0187985 A1* | 6/2016 | Lim | G06F 3/016 345/173 |

(Continued)

FOREIGN PATENT DOCUMENTS

EP 2887187 A1 6/2015
KR 10-2013-0089211 A 8/2013

*Primary Examiner* — Priyank Shah
(74) *Attorney, Agent, or Firm* — Dentons US LLP

(57) ABSTRACT

Provided is a display device. The display device includes: a touch sensitive element including an electroactive layer and a plurality of electrodes disposed on at least one of the top surface and the bottom surface of the electroactive layer; a shielding layer on the touch sensitive element; a display panel on the shielding layer; and a touch sensor integrated in the display panel and including a plurality of first touch electrodes and a plurality of second touch electrodes spaced apart from the plurality of first touch electrodes, and the shielding layer is electrically connected with the plurality of first touch electrodes or the plurality of second touch electrodes.

19 Claims, 6 Drawing Sheets

(56) References Cited

U.S. PATENT DOCUMENTS

2016/0188119 A1\* 6/2016 Ham ................... H01L 41/1132
                                                                           345/175
2017/0178470 A1\* 6/2017 Khoshkava ............. G06F 3/016
2017/0192507 A1\* 7/2017 Lee ......................... B32B 37/12
2017/0192508 A1\* 7/2017 Lim ......................... G06F 3/016

\* cited by examiner

DISPLAY DEVICE

CROSS-REFERENCE TO RELATED APPLICATIONS

This application claims priority from Korean Patent Application No. 10-2015-0190910 filed on Dec. 31, 2015, the disclosure of which is incorporated by reference as if fully set forth herein.

BACKGROUND

Technical Field

The present disclosure relates to a display device, including a display device which can reduce image quality deterioration and touch noise problems, which may occur when a touch sensitive element is applied to a display panel in which a touch sensor is integrated.

Description of the Related Art

Touch sensors that detect a touch input of a user, such as a screen touch for a display device or a gesture, are widely used in display devices public facilities and large-sized display devices, including smart TVs, and the like, in addition to portable display devices including smart phones, tablet PCs, and the like.

The touch sensors may be classified according to a position where the touch sensor is disposed in the display device. The touch sensors may be classified as: an in-cell type touch sensor, in which the touch sensor is embedded in a display panel; an on-cell type touch sensor, in which the touch sensor is positioned on the top of the display panel; an add-on type touch sensor, in which a separately manufactured touch sensor is separately disposed on the top of the display panel; and a hybrid type touch sensor, in which different types of touch sensors are combined. Among the various types of the touch sensors, the add-on type sensor has a disadvantage in that the thickness of the display device, and the corresponding manufacturing cost, increases because a separate touch sensor needs to be attached to the top of the display device. It is also difficult to attach the add-on type touch sensor to a flexible display device. Therefore, in recent years, there has been an increase interest in integrating the touch sensor in the display device by using the in-cell type touch sensor to provide a light and thin display device.

Meanwhile, research into a haptic device that does not just detect the touch input of the user but also transfers a tactile feedback, which may be felt with a finger of the user or a stylus pen of the user, as a feedback for the touch input of the user has been pursued in recent years.

As the haptic device, a haptic device adopting an eccentric rotating mass (ERM), a linear resonant actuator (LRA), a piezo ceramic actuator, and the like, have been used. However, such haptic devices are problematic in that the haptic devices: are made of an opaque material, vibrate the entirety of the display device rather than a specific part of the device; cannot provide various vibration feels; and may be easily broken by external impact due to low durability.

Further, when the driving voltage of the haptic device, which is required for transferring the tactile feedback to the user, a touch may not be recognized or an image may not be displayed normally due to noise generated due to the high driving voltage, which is also problematic.

Accordingly, there is a need for applying a haptic device acquired by solving the problems to the display device in which the touch sensor is integrated.

SUMMARY

An inventive aspect of the present disclosure is a device capable of removing electrical noise in a display panel.

The objects of the present disclosure are not limited to the aforementioned objects, and other objects not mentioned above, will be apparent to a person having ordinary skill in the art from the following description.

An exemplary embodiment of the present disclosure is directed to a display device comprising: a touch sensitive element including an electroactive layer and a plurality of electrodes disposed on at least one of a top surface and a bottom surface of the electroactive layer; a shielding layer on the touch sensitive element; a display panel on the shielding layer; and a touch sensor integrated in the display panel and including a plurality of first touch electrodes and a plurality of second touch electrodes spaced apart from the plurality of first touch electrodes, wherein the shielding layer is electrically connected with one of the plurality of first touch electrodes and the plurality of second touch electrodes.

In another exemplary embodiment, the plurality of first touch electrodes are driving electrodes, the plurality of second touch electrodes are sensing electrodes, and the shielding layer is electrically connected with the plurality of second touch electrodes.

In another exemplary embodiment, the display device comprises a first flexible printed circuit board including a line disposed on the shielding layer and electrically connected with the shielding layer; a second flexible printed circuit board including a line disposed on the display panel and electrically connected with the plurality of second touch electrodes; and a first printed circuit board including a first line connected with the line of the first flexible printed circuit board and a second line electrically connected with the line of the second flexible printed circuit board, wherein the shielding layer and the plurality of second touch electrodes are electrically connected to each other in the first printed circuit board through the first line and the second line.

In another exemplary embodiment, the display device comprises a second printed circuit board on which a central processing unit (CPU) for driving the display device is mounted; and a flexible cable electrically connecting the first printed circuit board and the second printed circuit board, wherein the first printed circuit board further includes a connector into which the flexible cable is inserted, a touch integrated circuit (IC) electrically connected with the second line and driving the touch sensor, and a third line electrically connected with the touch IC and transferring the same signal as the second line, and the first line and the third line are electrically connected with a ground pin of the connector.

In another exemplary embodiment, the first flexible printed circuit board further includes a plurality of lines electrically connected with the plurality of first electrodes and the plurality of second electrodes of the touch sensitive element.

In another exemplary embodiment, the shielding layer includes a transparent conductive layer made of a transparent conductive material.

In another exemplary embodiment, the plurality of electrodes of the touch sensitive element includes a plurality of first electrodes disposed on the top surface of the electroactive layer and a plurality of second electrodes disposed on the bottom surface of the electroactive layer and crossing the plurality of the first electrodes.

In another exemplary embodiment, when a first voltage is applied to one of the plurality of first electrodes, one of the plurality of second electrodes is grounded and the remaining second electrodes are floating.

In another exemplary embodiment, the active electric layer is made of an electroactive polymer, and the plurality of electrodes of the touch sensitive material are made of the transparent conductive material.

In another exemplary embodiment, the display device comprises a backlight unit disposed under the touch sensitive element, wherein the display panel is a liquid crystal display panel.

Another exemplary embodiment of the present disclosure provides a display device comprising: a display panel including a plurality of pixel electrodes and a plurality of common electrodes; a touch sensitive element disposed under the display panel, and including an electroactive layer and a plurality of electrodes disposed on at least one of a top surface and a bottom surface of the electroactive layer; and a shielding layer interposed between the touch sensitive element and the display panel and including a transparent conductive layer, wherein the plurality of common electrodes serves as touch sensitive electrodes, and a number of the plurality of common electrodes have the same potential as the transparent conductive layer.

In another exemplary embodiment, the device further comprises a first flexible printed circuit board contacting one surface of the shielding layer and electrically connected with the transparent conductive layer; a second flexible printed circuit board contacting one surface of the display panel and electrically connected with the plurality of common electrodes; and a first printed circuit board electrically connected with the first flexible printed circuit board and the second flexible printed circuit board, wherein each of the transparent conductive layer and a number of the plurality of common electrodes is electrically connected to the same point of the first printed circuit board through the first flexible printed circuit board and the second flexible printed circuit board.

In another exemplary embodiment, the first printed circuit board includes a cable connection connector, and the transparent conductive layer and a number of the plurality of common electrodes are electrically connected to a ground pin of the connector.

In another exemplary embodiment, the touch sensitive element is connected to the transparent conductive layer.

In another exemplary embodiment, the touch sensitive element and the transparent conductive layer comprise a same material.

In another exemplary embodiment, the thickness of the electroactive layer 133 is about 80 μm, the thicknesses of the first electrode and the second electrode are about 50 μm.

Other exemplary embodiments are included in the following detailed description and the appended drawings.

According to the present disclosure, it is possible to suppress deterioration in the image quality of a display panel and reduce noise generated by a high driving voltage of a touch sensitive element.

Further, it is possible to minimize misrecognition of a touch input or a ghost phenomenon for a touch input, which occurs due to the high driving voltage of the touch sensitive element in a display device having an in-cell type touch sensor.

The effects of the present disclosure are not limited to the aforementioned effects, and various other effects are included in the present specification, which would be apparent to one of ordinary skill in the art.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
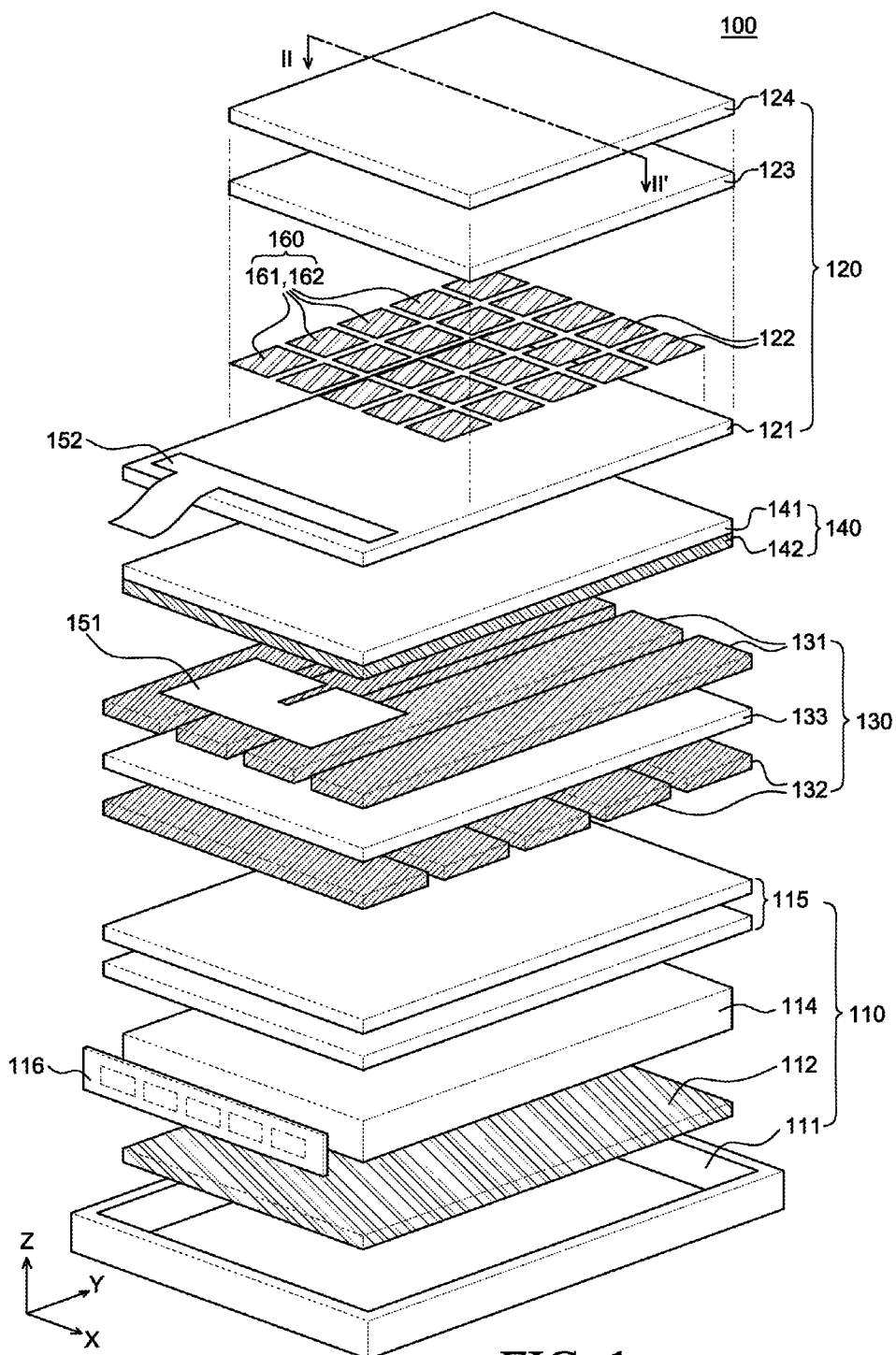
FIG. 1 is a schematic exploded perspective view illustrating a display device according to an exemplary embodiment of the present disclosure.

Advantages and features of the present disclosure, and methods for accomplishing the same, will be more clearly understood from exemplary embodiments described as follows with reference to the accompanying drawings. However, the present disclosure is not limited to the following exemplary embodiments and may be implemented in various different forms. The exemplary embodiments are provided only to complete disclosure of the present disclosure and to fully provide a person having ordinary skill in the art to which the present disclosure pertains with the category of the disclosure. The invention described herein will be defined by any of the appended claims, and combinations thereof.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description, a detailed explanation of known related technologies may be omitted to avoid unnecessarily obscuring the subject matter of the present disclosure. Terms such as "including," "having," and "consisting of" used herein are generally intended to allow other components to be added unless the terms are used with the term "only". Any references to the singular may include the plural unless expressly stated otherwise.

Components are interpreted to include an ordinary error range even if not expressly stated.

When the position relation between two parts is described using the terms such as "on", "above", "under", and "next", one or more parts may be positioned between the two parts unless the terms are used with the term "immediately" or "directly".

When an element or layer is referred to as being "on" another element or layer, it may be directly on the other element or layer, or intervening elements or layers may be present unless the terms are used with the term "immediately" or "directly".

Although the terms "first", "second", and the like are used for describing various components, these components are not confined by these terms. These terms are merely used for distinguishing one component from other components. Therefore, a first component may be a second component in a technical concept of the present disclosure.

The size and thickness of each component illustrated in the drawings are represented for convenience of explanation, and are not necessarily to scale.

The features of various embodiments of the present disclosure can be partially or entirely bonded to or combined with each other and can be interlocked and operated in various technical ways, and the various embodiments can be carried out independently of, or in association with, each other.

Hereinafter, various exemplary embodiments of the present disclosure will be described in detail with reference to the accompanying drawings, but the present disclosure is not limited thereto.

Figure 2:
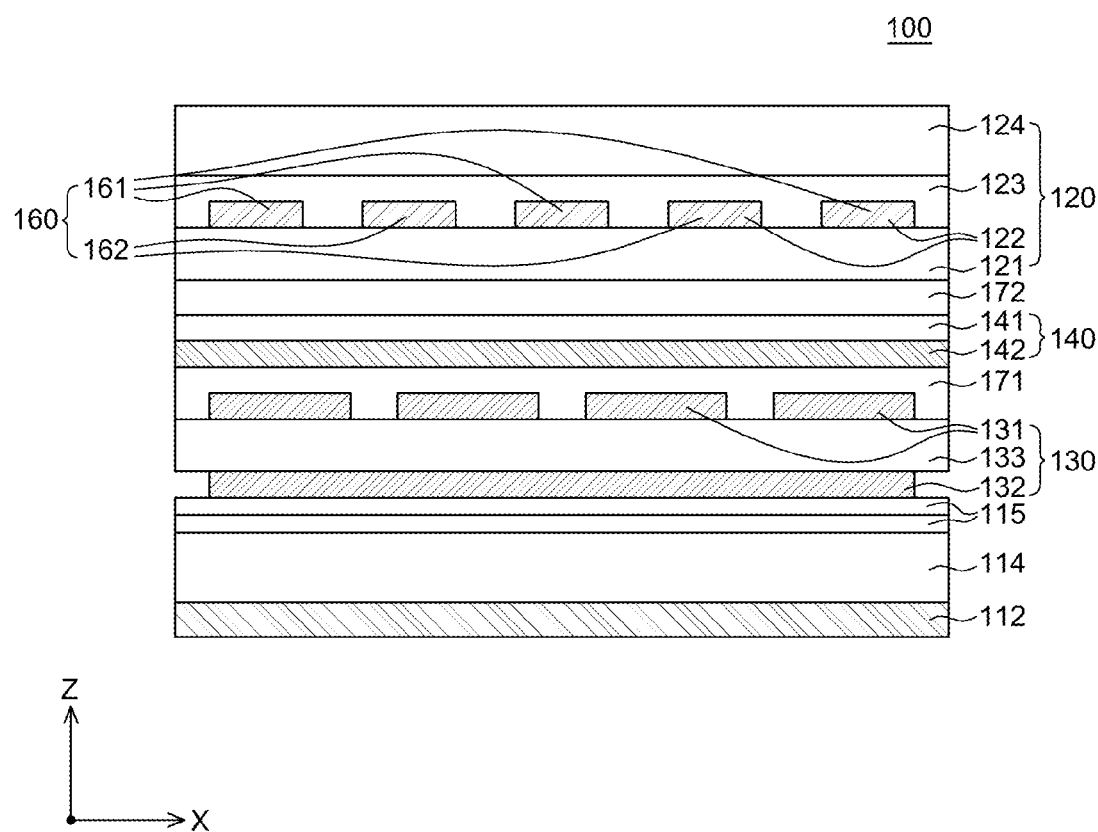
FIG. 2 is a cross-sectional view along line II-II' of the display device illustrated in FIG. 1.

FIG. 1 is a schematic exploded perspective view illustrating a display device according to an exemplary embodiment of the present disclosure, and FIG. 2 is a cross-sectional view along line II-II' of the display device illustrated in FIG. 1. Referring to FIGS. 1 and 2, the display device 100 includes a backlight unit 110, a display panel 120, a touch sensitive element 130, a shielding layer 140, and a touch sensor 160. For ease of description, a first bonding layer 171 and a second bonding layer 172 are not illustrated in FIG. 1, and a bottom plate 111 of the backlight unit 110 is not illustrated in FIG. 2.

The backlight unit 110 comprises components for providing light to the display panel 120. The backlight unit 110 includes a light source assembly 116, a light guide plate 114, a reflection plate 112, an optical sheet 115, and the bottom plate 111.

The light source assembly 116 includes a light source and a driving circuit driving the light source. In FIG. 1, an edge type light source assembly 116 is illustrated, but the light source assembly 116 may be a direct illumination type assembly.

The light guide plate 114 diffuses or condenses the light emitted from the light source assembly 116 and radiates the diffused or condensed light to the display panel 120. The light guide plate 114 may have a plate shape or a wedge shape, as illustrated in FIG. 1, but is not limited thereto.

The reflection plate 112 is disposed under the light guide plate 114. The reflection plate 112 reflects light radiated from the light source assembly 116 to be incident on the bottom of the light guide plate 114. The reflection plate 112 may be made of a metallic material having excellent reflectance, but is not limited thereto.

The optical sheet 115 is disposed on the light guide plate 114. The optical sheet 115 may improve the luminance characteristic of the light generated from the light source assembly 116. The optical sheet 115 may include, for example, a plurality of sheets including a diffusion sheet and a prism sheet.

The bottom plate 111 stores the optical sheet 115, the light guide plate 114, the reflection plate 112, and the light source assembly 116. As illustrated in FIG. 1, the bottom plate 111 has a box shape with an open top and the optical sheet 115, the light guide plate 114, the reflection plate 112, and the light source assembly 116 may be disposed in the bottom plate 111.

The display panel 120 is a panel for implementing an image in the display device 100. The display panel 120 adjusts transmittance of the light emitted from the backlight unit 110 to display the image. As illustrated in FIGS. 1 and 2, the display panel 120 includes a first substrate 121, a plurality of pixel electrodes (not shown for ease of explanation), a plurality of common electrodes 122, a liquid crystal layer 123, and a second substrate 124.

The first substrate 121 supports various components included in the display panel 120 and a thin film transistor, the plurality of pixel electrodes are electrically connected with the thin film transistor, and the plurality of common electrodes 122 forming an electric field with the plurality of pixel electrodes are disposed on the first substrate 121. Therefore, the first substrate may be referred to as a thin film transistor substrate.

The second substrate 124 faces the first substrate 121. The second substrate 124 supports a color filter layer, and may be referred to as a color filter substrate. The color filter layer selectively transmits light having a specific wavelength. A full-color image is displayed through the color filter layer. Although in FIG. 1, the color filter layer is disposed on the second substrate 124, the present disclosure is not limited thereto and the color filter layer may be disposed on the first substrate 121.

The liquid crystal layer 123 is disposed between the first substrate 121 and the second substrate 124. In the liquid crystal layer 123, liquid crystals may be oriented in a predetermined direction. The orientation of the liquid crystals may be changed based on the electric field between the plurality of pixel electrodes and the common electrode 122. The transmittance of the light emitted from the backlight unit 110 may be controlled by changing the orientation of the liquid crystals in the liquid crystal layer 123. The image is implemented as the light passing through the liquid crystal layer 123 passes through the color filter layer of the second substrate 124.

The touch sensor 160 is an in-cell type touch sensor configured to be integrated with the display panel 120. That is, the touch sensor 160 is disposed in the display panel 120. The touch sensor 160 includes a plurality of first touch electrodes 161 and a plurality of second touch electrodes 162 spaced apart from the plurality of first touch electrodes 161. All of the plurality of first touch electrodes 161 and the plurality of second touch electrodes 162 are formed integrally with the common electrode 122. In other words, the common electrode 122 of the display panel 120 also serves as the touch electrodes 161 and 162, and thus, one electrode may operate as both the common electrode 122 and the touch electrodes 161 and 162. Therefore, the display panel 120 is time-division driven, and thus, the image may be displayed by applying a common voltage to the common electrode 122 during an image display period and a touch input may be detected from a user through the common electrode 122 serving as the touch electrodes 161 and 162 during a touch sensing period.

The touch sensor 160 may be a mutual capacitance type touch sensor. When the touch sensor 160 is a mutual capacitance type touch sensor, one of the plurality of first touch electrodes 161 and the plurality of second touch electrodes 162 may be the driving electrodes and the other one may be the sensing electrodes. When it is assumed that the plurality of first touch electrodes 161 are the driving electrode and the plurality of second touch electrodes 162 are the sensing electrode for easy description, the plurality of first touch electrodes 161 and the plurality of second touch electrodes 162 are alternately disposed adjacent to each other in the same plane. When the driving voltage is sequentially applied to the plurality of first touch electrodes 161, which are the driving electrodes, an electric field is formed between the plurality of first touch electrodes 161 and the plurality of second touch electrodes 162, which are the sensing electrodes, and a capacitance is generated between the driving electrodes and the sensing electrodes. When the user performs a touch input by using a finger, the finger of the user serves as a ground source, and as a result, touch capacitance is formed between the finger of the user and the sensing electrode and the electric field is changed between the driving and sensing electrodes. Therefore, the capacitance value between the driving and sensing electrodes is also changed. As a result, when the driving voltage is applied to the plurality of first touch electrodes 161, which serve as the driving electrodes, a sensing signal is output to the plurality of second touch electrodes 162, which serve as the sensing electrodes, in an amount proportional to the change in the capacitance and the magnitude of the driving voltage during the touch. However, the present disclosure is not limited thereto and the touch sensor 160 may be implemented as a self-capacitance-type touch sensor.

As further illustrated in FIG. 1, a second flexible printed circuit board 152 is disposed on the display panel 120. Various lines for transmitting various signals for driving the display panel 120 and the touch sensor 160 to the display panel 120, and transmitting the sensing signal from the touch sensor 160 to a touch integrated circuit (IC) may be disposed in the second flexible printed circuit board 152. The second flexible printed circuit board 152 will be described in further detail with reference to FIGS. 3 and 4.

Further, a touch sensitive element 130 is disposed between the display panel 120 and the backlight unit 110. The touch sensitive element 130 has an electroactive layer 133 and a plurality of electrodes 131 and 132 disposed on the top surface and the bottom surface of the electroactive layer 133, respectively. In the present specification, the touch sensitive element is an element that may transfer a tactile feedback to the user in response to a touch by the user to the touch sensitive element, and the electroactive layer is a layer which transforms its shape when a voltage is applied to transfer a vibration.

The electroactive layer 133 is a plate-type film made of an electroactive polymer, which is a polymer material transformed by an electric stimulus. For example, the electroactive layer 133 may be made of a dielectric elastomer, such as a silicon-based polymer, an urethane-based polymer, or an acryl-based polymer; a ferroelectric polymer, such as polyvinylidene fluoride (PVDF), and poly (vinylidenefluoride-co-trifluoroethylene) (P(VDF-TrFE)); or a piezo ceramic element. When the electroactive layer 133 is made of the dielectric elastomer, the dielectric elastomer expands and contracts due to the electrostatic attraction (Coulombic force) generated by applying a voltage to the electroactive layer 133, thereby vibrating the touch sensitive element 130. Alternatively, when the electroactive layer 133 is made of the ferroelectric polymer, the orientation direction of a dipole in the electroactive layer 133 is changed by applying the voltage to the electroactive layer 133, thereby vibrating the touch sensitive element 130.

The touch sensitive element 130 includes a plurality of first electrodes 131 disposed on the top surface of the electroactive layer 133 and a plurality of second electrodes 132 disposed on the bottom surface of the electroactive layer 133. However, the present disclosure is not limited thereto and the plurality of first electrodes 131 and the plurality of second electrodes 132 may be formed only on any one of the top and bottom surfaces of the electroactive layer 133.

The plurality of first electrodes 131 and the plurality of second electrodes 132 apply a voltage to the electroactive layer 133, and are made of a conductive material. Further, in order to secure the transmittance of the touch sensitive element 130, the plurality of first electrodes 131 and the plurality of second electrodes 132 may be made of a transparent conductive material. For example, the plurality of first electrodes 131 and the plurality of second electrodes 132 may be made of the transparent conductive material, such as indium tin oxide (ITO), PEDOT:PSS, silver-nanowire (AgNW), and the like. Alternatively, the plurality of first electrodes 131 and the second electrodes 132 may be configured by metal mesh, in which a metallic material is disposed in a mesh pattern, and thus, the plurality of first electrodes 131 and the plurality of second electrodes 132 may substantially serve as transparent electrodes. However, the materials of the plurality of first electrodes 131 and the plurality of second electrodes 132 are not limited to the aforementioned examples, and various transparent conductive materials may be used. The first electrode 131 and the second electrode 132 may be made of the same material or different materials.

The first electrode 131 and the second electrode 132 may be formed by various methods. For example, the first electrode 131 and the second electrode 132 may be formed on the electroactive layer 133 by using methods including sputtering, printing, slit coating, and the like.

As described above, the touch sensitive element 130 made of the electroactive polymer may transfer the tactile feedback to the user through the vibration of the electroactive layer 133 generated by applying a voltage to the first electrode 131 and the second electrode 132 disposed on the top surface and the bottom surface of the electroactive layer 133, respectively. Further, as described above, the touch sensitive element 130 has high transmittance, because the touch sensitive element 130 may be made of transparent materials, such as the transparent electroactive polymer and the transparent conductive material.

In general, when the touch sensitive element is disposed on the touch sensor, there is a problem in that the touch sensor may not sense the capacitance change which may occur with the touch input by the user as a high voltage is applied to the touch sensitive element. In order to solve this problem, the touch sensitive element is disposed under the touch sensor and when the touch sensor is embedded in the display panel, the touch sensitive element is disposed under both the display panel and the touch sensor. However, when the touch sensitive element is disposed under the display panel, it is difficult to transfer direct and strong vibration to the user because the touch sensitive element is positioned as a distance from the touch input part. Therefore, the elements such as an ERM or an LRA used in the related art may be disposed between the backlight unit and the display panel. However, it is impossible to dispose the elements on the backlight unit, because these elements are made of opaque materials.

In comparison, the touch sensitive element 130 of the display device 100 has high transmittance because the touch sensitive element 130 includes the electroactive layer 133 made of the transparent electroactive polymer and the plurality of electrodes 131 and 132 made of the transparent conductive material. Accordingly, in the display device 100 the touch sensitive element 130 may be disposed between the display panel 120 and the backlight unit 110 rather than under the backlight unit 100, and the light emitted from the backlight unit 110 may pass through the touch sensitive element 130 to the display panel 120. Alternatively, the touch sensitive element 130 may be disposed above the backlight unit 110, to reduce the distance between the finger of the user and the touch sensitive element 130 such that stronger vibrations may be provided to the user.

The touch sensitive element 130 illustrated in FIGS. 1 and 2 may be driven by a passive matrix method. That is, the plurality of first electrodes 131 and the plurality of second electrodes 132 disposed on the top surface and the bottom surface of the touch sensitive element 130, respectively, are formed in a bar shape and the plurality of first electrodes 131 extend in a first direction, for example, a Y-axis direction, and the plurality of second electrodes 132 extend in a second direction, for example, an X-axis direction. Accordingly, the plurality of first electrodes 131 and the plurality of second electrodes 132 are disposed alternately, and perpendicular, to each other. The touch sensitive element 130 applies a driving voltage to one of the plurality of first electrodes 131, grounds one of the plurality of second electrodes 132, and floats the residual electrodes among the plurality of second electrodes. As a result, the touch sensitive element 130 may be driven to vibrate at a point where the first electrode 131 to which the driving voltage is applied and the grounded second electrode 132 cross each other. However, the present disclosure is not limited thereto, and the voltage may be reversely applied to the plurality of first electrodes 131 and the plurality of second electrodes 132.

In the touch sensitive element including the electroactive layer, a driving voltage of hundreds of V to several kV needs to be applied to generate vibrations through the electroactive layer. Further, the touch sensitive element needs to be driven while being divided into minute units in order to transfer a realistic tactile feedback and the number of elements capable of distributing a high voltage of hundreds of V to several kV among circuit components, which are currently developed or commercialized, and voltage amplification elements, such as multiple minute units, are required. Therefore, it is difficult to miniaturize the driving circuit for driving the touch sensitive element.

In the display device 100, the plurality of first electrodes 131 and the plurality of second electrodes 132 are disposed as described above to solve the difficulties associated with implementing a driving circuit that provide a high driving voltage to the touch sensitive element 130. As a result, the number of amplification elements for amplifying the driving voltage may be significantly reduced.

As further illustrated in FIGS. 1 and 2, a shielding layer 140 is interposed between the display panel 120 and the touch sensitive element 130. The shielding layer 140 is a component for removing noise generated by the high driving voltage of the touch sensitive element 130. The shielding layer 140 includes an insulating layer 141 and a transparent conductive layer 142 disposed on one surface of the insulating layer 141. The shielding layer 140 is bonded with the touch sensitive element 130 through the first bonding layer 171 and bonded with the display panel 120 through the second bonding layer 172. The first bonding layer 171 and the second bonding layer 172 may be made of a transparent adhesive material. The first bonding layer 171 and the second bonding layer 172 may be, for example, an optical clear adhesive (OCA) or an optical clear resin (OCR), but are not limited thereto.

The insulating layer 141 of the shielding layer 140 may be made of an insulating material, including transparent insulating materials such as polyethyleneterephthalate (PET), polyimide (PI), and the like, but the disclosure is not limited thereto. The transparent conductive layer 142 is a conductive layer for removing the noise generated by the high driving voltage of the touch sensitive element 130. The transparent conductive layer 142 may be made of transparent conductive materials including ITO, and the like. The transparent conductive layer 142 may be formed on the insulating layer 141 using various methods including sputtering, and the like. As illustrated in FIGS. 1 and 2, the transparent conductive layer 142 may be disposed on the insulating layer 141 and the shielding layer 140 including the transparent conductive layer 142 and the insulating layer 141 may be bonded to the touch sensitive element 130 and the display panel 120 by the first bonding layer 171 and the second bonding layer 172, but the present disclosure is not limited thereto. The shielding layer 140 may be made of only the transparent conductive layer 142, which may be directly formed on a rear surface of the display panel 120, omitting the requirement for of insulating layer 141. As both the transparent conductive layer 142 and the insulating layer 141 of the shielding layer 140 are made of a transparent material, the shielding layer 140 may also be disposed between the display panel 120 and the backlight unit 110.

A first flexible printed circuit board 151 is disposed between the shielding layer 140 and the touch sensitive element 130. A connection relationship of the first flexible printed circuit board 151 and the shielding layer 140 will be described in more detail with reference to FIGS. 3 and 4.

Figure 3:
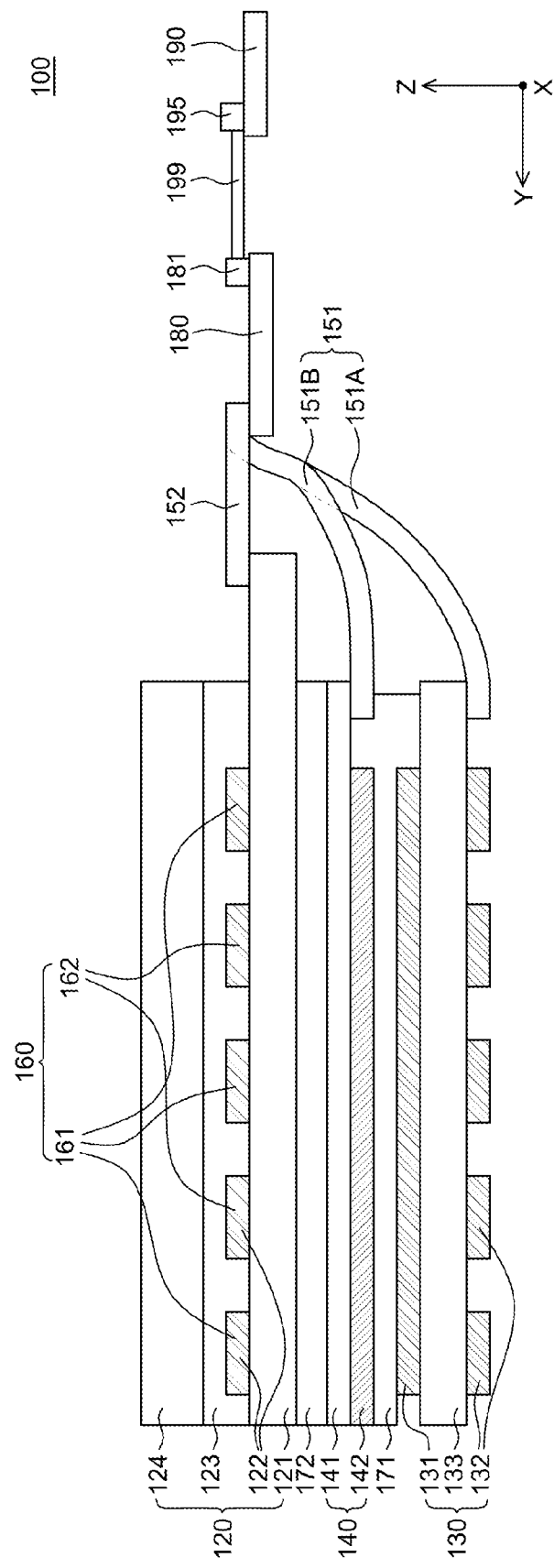
FIG. 3 is a cross-sectional view illustrating a display device according to an exemplary embodiment of the present disclosure.
Figure 4:
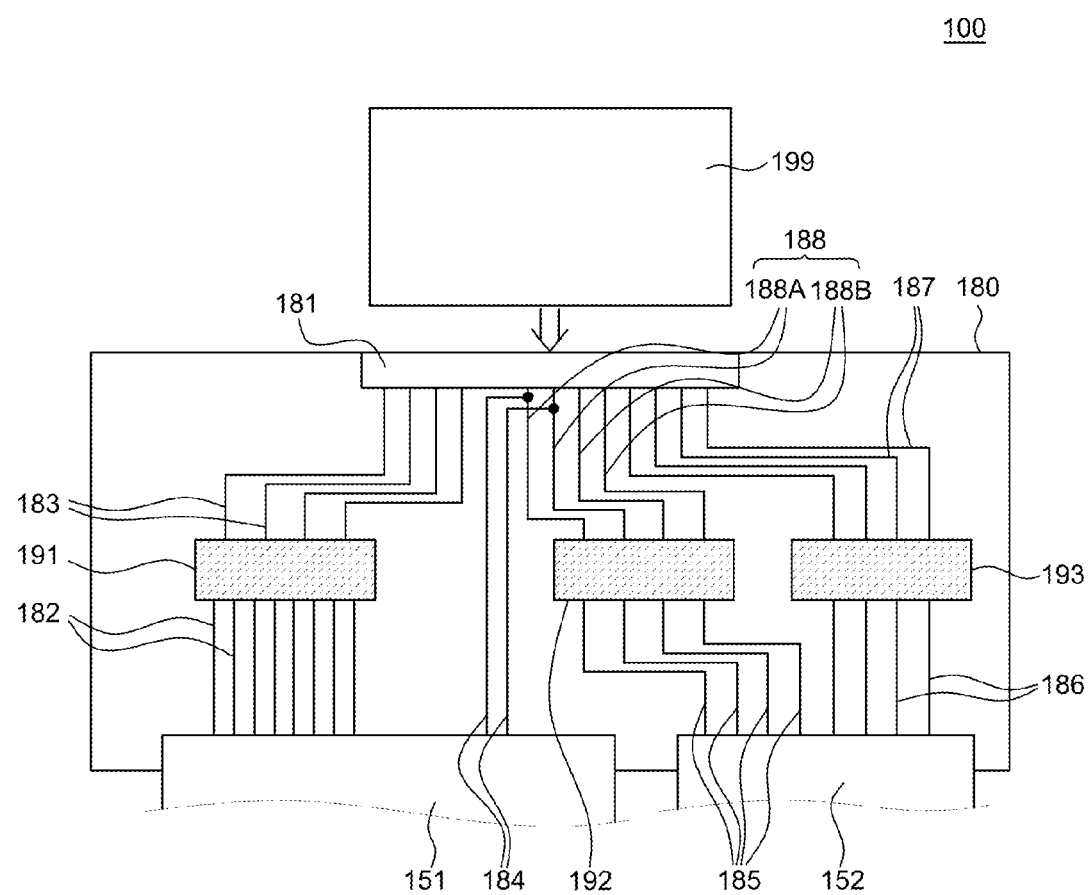
FIG. 4 is a schematic plan view of a display device according to an exemplary embodiment of the present disclosure.

FIG. 3 is a left side view of the display device 100, i.e., it is a side view of the display device illustrated in FIG. 1 when viewed along the X-axis direction. FIG. 4 is a plan view of the first flexible printed circuit board 151, the second flexible printed circuit board 152, and the first printed circuit board 180 illustrated in FIG. 3. FIG, 4 illustrates only a partial region of the first flexible printed circuit board 152 and the second flexible printed circuit board 152.

As illustrated in FIGS. 3 and 4, the first flexible printed circuit board 151 includes a first part 151A disposed on the shielding layer 140 and a second part 151B disposed in the touch sensitive element 130. The first part 151A of the first flexible printed circuit board 151 is disposed to contact one surface of the insulating layer 141 and has a line electrically connected with the transparent conductive layer 142 of the shielding layer 140. The second part 151B of the first flexible printed circuit board 151 is disposed on the electroactive layer 133 of the touch sensitive element 130, and has a plurality of lines electrically connected with the plurality of first electrodes 131 and the plurality of second electrodes 132 of the touch sensitive element 130. The first part 151A and the second part 151B of the first flexible printed circuit board 151 are connected to each other to be disposed on one surface of the first printed circuit board 180. That is, the first flexible printed circuit board 151 electrically connects the transparent conductive layer 142 of the shielding layer 140 with a line 184 of the first printed circuit board 180 through the first part 151A and electrically connects the plurality of first electrodes 131 and the plurality of second electrodes 132 of the touch sensitive element 130 with a line 182 of the printed circuit board through the second part 151B. As a result, both the touch sensitive element 130 and the shielding layer 140 may be connected to one flexible printed circuit board 151.

As illustrated in FIGS. 3 and 4, one end of the second flexible printed circuit board 152 is disposed on the display panel 120 and the other end is disposed on the first printed circuit board 180. One end of the second flexible printed circuit board 152 is disposed to be in contact with the top surface of the first substrate 121 of the display panel 120, and the second flexible printed circuit board 152 has a line electrically connected with the plurality of first touch electrodes 161 and the plurality of touch electrodes 162 of the touch sensor 160. Further, the second flexible printed circuit board 152 has a line electrically connected with the plurality of pixel electrodes. The other end of the second flexible printed circuit board 152 is disposed on one surface of the first printed circuit board 180. That is, the second flexible printed circuit board 152 electrically connects the plurality of pixel electrodes of the display panel 120 with line 186 of the first printed circuit board 180 and electrically connects the plurality of first touch electrodes 161 and the plurality of touch electrodes 162 of the touch sensor 160, that is, the common electrode 122 of the display panel 120 with line 186 of the first printed circuit board 180.

Further, as illustrated in FIG. 4, the first printed circuit board 180 includes a plurality of lines 182, 183, 184, 185, 186, 187, and 188, a plurality of ICs 191, 192, and 193, and a connector 181. For example, the first IC 191 is a haptic IC for driving the touch sensitive element 130, the second IC 192 is a touch IC for driving the touch sensor 160, and the third IC 193 is a display IC for driving the display panel 120. Although, as illustrated in FIG. 4, the first printed circuit board 180 includes the plurality of ICs 191, 192, and 193, the present disclosure is not limited thereto, and the first IC 191, the second IC 192, and the third IC 193 may be implemented as one IC and configured while being divided into more ICs.

The first printed circuit board 180 is connected to a second printed circuit board 190 on which a CPU controlling the display panel 120, the touch sensor 160, and the touch sensitive element 130 is mounted to drive the display device 100. The first printed circuit board 180 may be electrically connected with the second printed circuit board 190 through a flexible cable 199 and the first printed circuit board 180 and the second printed circuit board 190 include cable connection connectors 181 and 195 into which the flexible cable 199 is inserted, respectively. The respective connectors 181 and 195 have a plurality of pins and in particular, the plurality of pins of the connector 181 inserted into the first printed circuit board 180 is electrically connected with the plurality of lines 182, 183, 187, and 188 of the first printed circuit board 180.

The plurality of lines 182, 183, 184, 185, 186, 187, and 188 of the first printed circuit board 180 are the lines for electrically connecting the first flexible printed circuit board 151, the second flexible printed circuit board 152, the plurality of ICs 191, 192, and 193, and the connector 181 disposed on the first printed circuit board 180. For example, the first line 184 electrically connects the line of the first flexible printed circuit board 151 and the pin of the connector 181, the second line 185 electrically connects the line of the second flexible printed circuit board 152 and the second IC 192, the plurality of third lines 188, which includes a plurality of lines 188A and 188B electrically connects the second IC 192 and the pin of the connector 181, the fourth line 182 electrically connects the line of the first flexible printed circuit board 151 and the first IC 191, the fifth line 183 electrically connects the first IC 191 and the pin of the connector 181, the sixth line 186 electrically connects the line of the first flexible printed circuit board 151 and the third IC 913, and the seventh line 187 electrically connects the third IC 193 and the pin of the connector 181. However, the present disclosure is not limited thereto, and additional lines may be disposed on the first printed circuit board 180.

The plurality of first electrodes 131 and the plurality of second electrodes 132 of the touch sensitive element 130 are electrically connected with the line of the first part 151A of the first flexible printed circuit board 151 disposed on the electroactive layer 133 and the line of the first part 151A of the first flexible printed circuit board 151 is electrically connected with the fourth line 182 of the first printed circuit board 180. The fourth line 182 of the first printed circuit board 180 is electrically connected to the first IC 191, which is an IC for driving the touch sensitive element 130. The fifth line 185 of the first printed circuit board 180 electrically connects the first IC 191 and the connector 181 of the first printed circuit board 180.

The shielding layer 140 is electrically connected with the plurality of first touch electrodes 161 or the plurality of second touch electrodes 162 of the touch sensor 160. As described above, when the plurality of second touch electrodes 162 is the sensing electrode of the touch sensor 160, the transparent conductive layer 142 of the shielding layer 140 may be electrically connected with the plurality of second touch electrodes 162 of the touch sensor 160.

The electrical connection of the transparent conductive layer 142 and the plurality of second touch electrodes 162 of the touch sensor 160 is described in more detail with reference to FIGS. 3 and 4. The transparent conductive layer 142 is electrically connected with the line of the second part 151B of the first flexible printed circuit board 151 disposed on the shielding layer 140 and the line of the second part 151B is electrically connected with the first line 184 of the first printed circuit board 180. The first line 184 of the first printed circuit board 180 is electrically connected with the pin of the connector 181 in the first printed circuit board 180. Herein, the pin of the connector 181 connected with the first line 184 of the first printed circuit board 180 may be a ground pin.

The plurality of pixel electrodes and the common electrode 122 are electrically connected with the third IC 193, which is an IC for driving the display panel 120 through the line of the second flexible printed circuit board 152 disposed on the first substrate 121 of the display panel 120 and the sixth line 186 of the first printed circuit board 180. The seventh line 187 of the first printed circuit board 180 electrically connects the third IC 193 and the connector 181 of the first printed circuit board 180.

The plurality of first touch electrodes 161 and the plurality of second touch electrodes 162 of the touch sensor 160 are electrically connected with the line of the second flexible printed circuit board 152 disposed on the first substrate 121 of the display panel 120 and the line of the second flexible printed circuit board 152 is electrically connected with the second line 185 of the first printed circuit board 180. The second line 185 of the first printed circuit board 180 is electrically connected to the second IC 192 which is the touch IC in the first printed circuit board 180. The third line 188 of the first printed circuit board 180 electrically connects the second IC 192, and the pin of the connector 181 of the first printed circuit board 180. In particular, the third line 188 includes a plurality of lines 188A and 188B, such that plurality of lines 188B re electrically connected with the plurality of first touch electrodes 161 and the plurality of lines 188A are electrically connected with the plurality of second touch electrodes 162. That is, the plurality of lines 188A transfer the same signal as the line connected with the plurality of second touch electrodes 162 among the plurality of second lines 185.

According to the line layout structure as described above, the shielding layer 140 and the plurality of second touch electrodes 162 are electrically connected with each other in the first printed circuit board 180. A plurality of first lines 184 of the first printed circuit board 180, which are electrically connected with the transparent conductive layer 142 via the pin of the connector 181 through the plurality of second lines 185, and the plurality of lines 188A are electrically connected with the plurality of second touch electrodes 162. Although in FIG. 4, the plurality of first lines 184 and the plurality of lines 188A of the first printed circuit board 180 are illustrated as being electrically connected with each other outside the connector 181 for ease of illustration, the disclosure is not limited thereto, and the plurality of first lines 184 and the plurality of lines 188A may be electrically connected with each other such that they contact the pin of the connector 181 under the connector 181. Therefore, the transparent conductive layer 142 of the shielding layer 140 and the plurality of second touch electrodes 162, that is, some of the common electrodes 122 of the display panel 120, may be electrically connected with each other at the same point of the first printed circuit board 180, for example, the pin of the connector 181 through the first flexible printed circuit board 151 and the second flexible printed circuit board 152. Based on such a circuit configuration, the transparent conductive layer 142 of the shielding layer 140 may have the same potential as the plurality of second touch electrodes 162.

In the display device 100, the plurality of second touch electrodes 162 which is some of the plurality of common electrodes 122 and the sensing electrode is electrically connected with the shielding layer 140 to have the same potential as the transparent conductive layer 142 of the shielding layer 140. Therefore, an interference phenomenon occurring in the display panel 120 and the touch sensor 160 due to the electric field generated as the touch sensitive element 130 is driven may be reduced by including the shielding layer 140.

The touch sensitive element 130 of the display device 100 may be driven by the passive matrix method. For example, when the driving voltage is applied to any one of the plurality of first electrodes 131, which extends in the first direction on the top surface of the electroactive layer 133, any one of the plurality of second electrodes 132 which extends in the second direction on the bottom surface of the electroactive layer 133 and is grounded, and any other electrodes, which are floating, vibrations occur at the point where the first electrode 131, to which the driving voltage is applied, and the grounded second electrode 132 cross each other. However, since the driving voltage applied to the first electrode 131 is a high voltage of hundreds of V to several kV, and another second electrode 132, which is not grounded, is floating, this other second electrode 132 may be charged to have a similar potential as the driving voltage applied to the first electrode 131. The potential of the charged second electrode 132 is then applied to the display panel 120 and the touch sensor 160 resulting in the generation of electrical noise, and the display panel 120 and the touch sensor 160 may fail.

For example, when electrical noise is generated in the display panel 120, a driving element, such as the thin film transistor disposed on the first substrate 121 of the display panel 120, may be damaged, and the display panel 120 may not be driven normally. Further, an additional electric field may be generated by the potential of the second electrode 132 and the liquid crystals of the liquid crystal layer 123 may not be oriented as, thereby reducing image quality and/or turning off the display screen.

To address the above-discussed disadvantages, in the display device 100, electrical noise generated by the touch sensitive element 130 may be removed by the shielding layer 140 disposed between the touch sensitive element 130 and the display panel 120. Further, the transparent conductive layer 142 of the shielding layer 140 is electrically connected to the ground pin of the connector 181 of the first printed circuit board 180, and has the same potential as the plurality of second touch electrodes 162 of the touch sensor 160, that is, some of the common electrodes 122, and as a result, the display quality is maintained and/or the display panel 120 can continue to operate at the high driving voltage applied to the touch sensitive element 130.

In addition, when the high driving voltage of the touch sensitive element 130 is applied to the touch sensor 160 as electrical noise, the capacitance change by the touch input of the user may not be accurately sensed, and the touch input of the user may not be recognized or be misrecognized. Moreover, a ghost phenomenon may occur, in which the capacitance is changed at a region where the user does not perform the touch input by the electrically noise generated by the high driving voltage of the touch sensitive element 130, and the touch sensor 160 recognizes that the touch input occurs at a position where the touch input of the user did not occur.

Therefore, in the display device 100, electrical noise, which may generated by the touch sensitive element 130, may be removed by the shielding layer 140 disposed between the touch sensitive element 130 and the touch sensor 160. Further, the transparent conductive layer 142 of the shielding layer 140 is electrically connected to the ground pin of the first printed circuit board 180 and additionally has the same potential as the plurality of second touch electrodes 162 of the touch sensor 160 to minimizes non-recognition or misrecognition of the touch, which may occur at the high driving voltage applied to the touch sensitive element 130.

Hereinafter, an effect in which the electrical noise, which may be transferred to the touch sensor 160, is interrupted by the shielding layer 140 of the display device 100 will be described with reference to both FIGS. 5 and 6.

Figure 5:
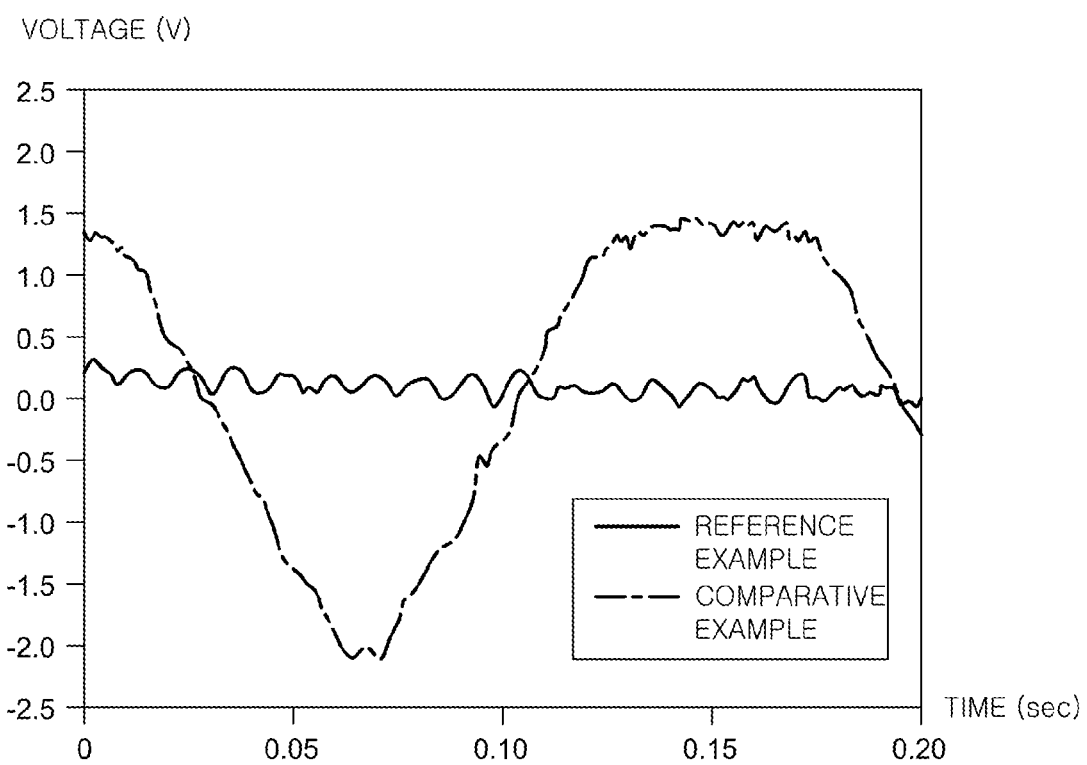
FIG. 5 is a waveform generated by a touch electrode in a display device according to a comparative example.
Figure 6:
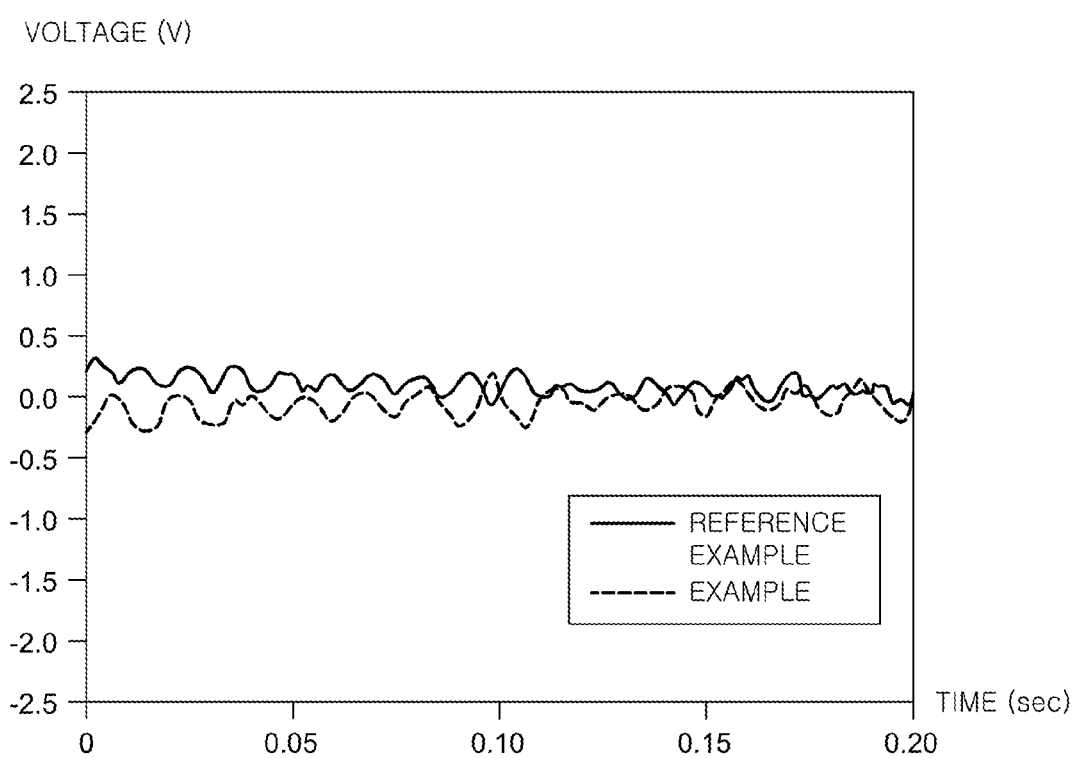
FIG. 6 is a waveform generated by a touch electrode in a display device according to an exemplary embodiment of the present disclosure.

FIG. 5 is a waveform generated by a touch electrode in a display device according to a comparative example, and FIG. 6 is a waveform generated by a touch electrode in a display device according to an exemplary embodiment of the present disclosure.

FIGS. 5 and 6 are graphs plotting the voltage value in the plurality of second touch electrodes 162 of the touch sensor 160, that is, the sensing electrode depending on whether the touch sensitive element 130 is driven and whether the shielding layer 140 is electrically connected in the display device 100 illustrated in FIGS. 1 to 4 as a function of time. The comparative example of FIG. 5 represents the voltage value in the second touch electrodes 162 when the touch sensitive element 130 is driven, but the shielding layer 140 is floating, and the exemplary embodiment of FIG. 6 represents the voltage value in the second touch electrodes 162 when the touch sensitive element 130 is driven and the transparent conductive layer 142 of the shielding layer 140 is connected to have the same potential as the second touch electrodes 162. The electroactive layer 133 of the touch sensitive element 130 of the exemplary embodiment is made of PVDF and the first electrodes 131 and the second electrodes 132 are made of ITO. Further, the thickness of the electroactive layer 133 is 80 μm and the thicknesses of the first electrode and the second electrode 132 are 50 μm. The shielding layer 140 includes the insulating layer 141 made of the PET and the transparent conductive layer 142 made of the ITO, the thickness of the insulating layer 141 is 100 μm, and the thickness of the transparent conductive layer 142 is 50 μm.

Referring to FIGS. 5 and 6, when the touch sensitive element 130 is not driven, that is, when electrical noise is not generated by the touch sensitive element 130, the voltage value of the second touch electrodes 162, which are the sensing electrodes of the touch sensor 160, has a value substantially close to 0 V and an amplitude smaller than 0.5 V.

Referring to the comparative example of FIG. 5, the electrical noise generated influences the touch sensor 160, because the transparent conductive layer 142 of the shielding layer 140 is not connected with the second touch electrode 162. Thus, the voltage value of the second touch elecrtodes 162 oscillates significantly with a large deviation between approximately 1.5 V and approximately −2 V.

In comparison, referring to the exemplary embodiment of FIG. 6, although driving the touch sensitive element 130 generates electrical noise, the transparent conductive layer 142 of the shielding layer 140 is connected to have the same potential as the second touch electrode 162, and the voltage value of the second touch electrode 162 has a value substantially close to 0 V, similar to the values observed for the reference example, and the amplitude of oscillation is also much smaller, approximately 0.5 V or less.

Therefore, in the display device 100 according to the exemplary embodiment of the present disclosure, the transparent conductive layer 142 of the shielding layer 140 has the same potential as the plurality of second touch electrodes 162 of the touch sensor 160, and thus, touch non-recognition or misrecognition is minimized.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. It should be understood that the above-described exemplary embodiments are illustrative in all aspects and do not limit the present disclosure. The protective scope of the present disclosure should be construed based on any appended claims, and combinations thereof, and all the technical concepts in the equivalent scope thereof should be construed as falling within the scope of the present disclosure.

What is claimed is:

1. A display device comprising:
a touch sensitive element including an electroactive layer and a plurality of electrodes disposed on at least one of a top surface and a bottom surface of the electroactive layer;
a shielding layer on the touch sensitive element;
a display panel on the shielding layer; and
a touch sensor integrated in the display panel and including a plurality of first touch electrodes and a plurality of second touch electrodes spaced apart from the plurality of first touch electrodes,
wherein the shielding layer is electrically connected with one of the plurality of first touch electrodes and the plurality of second touch electrodes.

2. The display device according to claim 1, wherein:
the plurality of first touch electrodes are driving electrodes,
the plurality of second touch electrodes are sensing electrodes, and
the shielding layer is electrically connected with the plurality of second touch electrodes.

3. The display device according to claim 2, further comprising:
a first flexible printed circuit board including a line disposed on the shielding layer and electrically connected with the shielding layer;
a second flexible printed circuit board including a line disposed on the display panel and electrically connected with the plurality of second touch electrodes; and
a first printed circuit board including a first line connected with the line of the first flexible printed circuit board and a second line electrically connected with the line of the second flexible printed circuit board,
wherein the shielding layer and the plurality of second touch electrodes are electrically connected to each other in the first printed circuit board through the first line and the second line.

4. The display device according to claim 3, further comprising:
a second printed circuit board on which a central processing unit (CPU) for driving the display device is mounted; and
a flexible cable electrically connecting the first printed circuit board and the second printed circuit board,
wherein the first printed circuit board further includes a connector into which the flexible cable is inserted, a touch integrated circuit (IC) electrically connected with the second line and driving the touch sensor, and a third line electrically connected with the touch IC and transferring the same signal as the second line, and
the first line and the third line are electrically connected with a ground pin of the connector.

5. The display device according to claim 3, wherein the first flexible printed circuit board further includes a plurality of lines electrically connected with the plurality of first electrodes and the plurality of second electrodes of the touch sensitive element.

6. The display device according to claim 1, wherein the shielding layer includes a transparent conductive layer made of a transparent conductive material.

7. The display device according to claim 1, wherein the plurality of electrodes of the touch sensitive element includes a plurality of first electrodes disposed on the top surface of the electroactive layer and a plurality of second electrodes disposed on the bottom surface of the electroactive layer and crossing the plurality of the first electrodes.

8. The display device according to claim 7, wherein when a first voltage is applied to one of the plurality of first electrodes, one of the plurality of second electrodes is grounded and the remaining second electrodes are floating.

9. The display device according to claim 1, wherein the active electric layer is made of an electroactive polymer, and the plurality of electrodes of the touch sensitive material are made of the transparent conductive material.

10. The display device according to claim 9, further comprising:
a backlight unit disposed under the touch sensitive element,
wherein the display panel is a liquid crystal display panel.

11. A display device comprising:
a display panel including a plurality of pixel electrodes and a plurality of common electrodes;
a touch sensitive element disposed under the display panel, and including an electroactive layer and a plurality of electrodes disposed on at least one of a top surface and a bottom surface of the electroactive layer; and a shielding layer between the touch sensitive element and the display panel and including a transparent conductive layer, wherein the plurality of common electrodes serve as touch sensitive electrodes, and a number of the plurality of common electrodes have a same potential as the transparent conductive layer.

12. The display device according to claim 11, further comprising:

a first flexible printed circuit board contacting one surface of the shielding layer and electrically connected with the transparent conductive layer;

a second flexible printed circuit board contacting one surface of the display panel and electrically connected with the plurality of common electrodes; and a first printed circuit board electrically connected with the first flexible printed circuit board and the second flexible printed circuit board, wherein each of the transparent conductive layer and a number of the plurality of common electrodes is electrically connected to the same point of the first printed circuit board through the first flexible printed circuit board and the second flexible printed circuit board.

13. The display device according to claim 12, wherein the first printed circuit board includes a cable connection connector, and the transparent conductive layer and a number of the plurality of common electrodes are electrically connected to a ground pin of the connector.

14. The display device according to claim 6, wherein the touch sensitive element is connected to the transparent conductive layer.

15. The display device according to claim 14, wherein the touch sensitive element and the transparent conductive layer comprise a same material.

16. The display device according to claim 11, wherein the touch sensitive element is connected to the transparent conductive layer.

17. The display device according to claim 16, wherein the touch sensitive element and the transparent conductive layer comprise a same material.

18. The display device according to claim 1, wherein the thickness of the electroactive layer 133 is about 80 μm, the thicknesses of the first electrode and the second electrode are about 50 μm.

19. The display device according to claim 11, wherein the thickness of the electroactive layer 133 is about 80 μm, the thicknesses of the first electrode and the second electrode are about 50 μm.

* * * * *